May 29, 1956     C. FIELD     2,747,379
LAMINAE FREEZER

Filed April 9, 1952     10 Sheets-Sheet 1

INVENTOR.
CROSBY FIELD
BY
ATTORNEYS

INVENTOR.
CROSBY FIELD

INVENTOR.
CROSBY FIELD

May 29, 1956  C. FIELD  2,747,379
LAMINAE FREEZER
Filed April 9, 1952  10 Sheets-Sheet 5
FIG. 7.
FIG. 8.
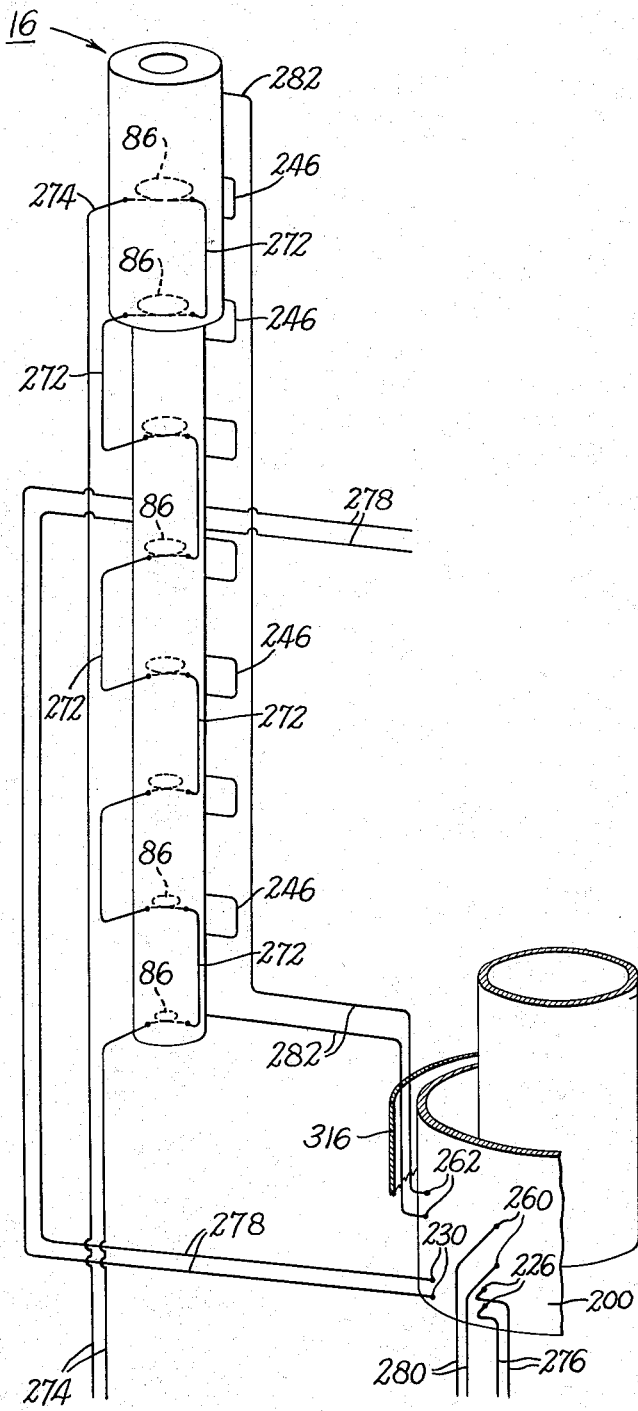
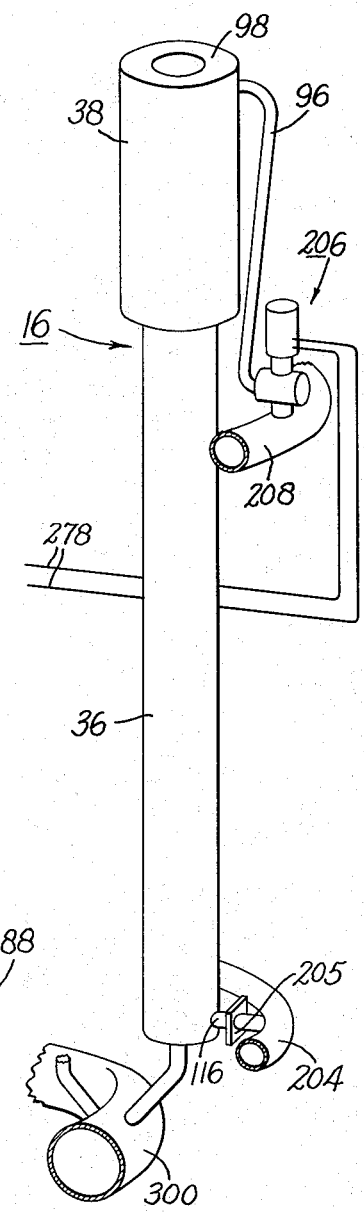
INVENTOR.
CROSBY FIELD
BY
Curtis, Morris + Safford
ATTORNEYS May 29, 1956

C. FIELD 2,747,379

LAMINAE FREEZER

Filed April 9, 1952

INVENTOR.
CROSBY FIELD

BY Curtis, Morris + Safford
ATTORNEYS

May 29, 1956 C. FIELD 2,747,379
LAMINAE FREEZER
Filed April 9, 1952 10 Sheets-Sheet 7
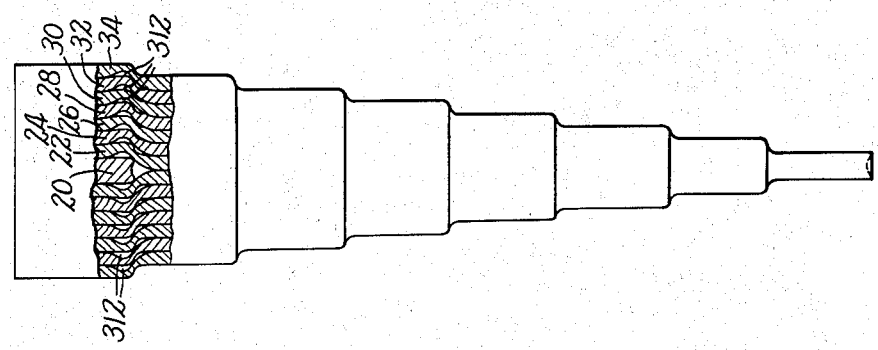
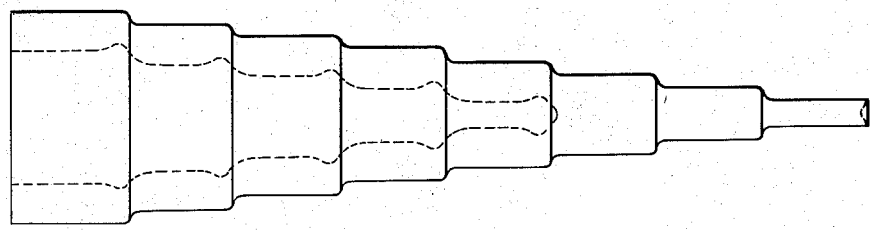
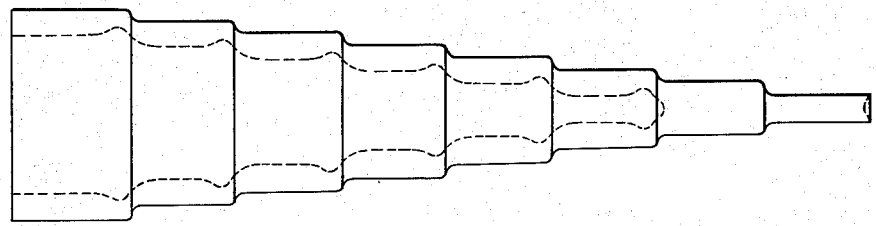
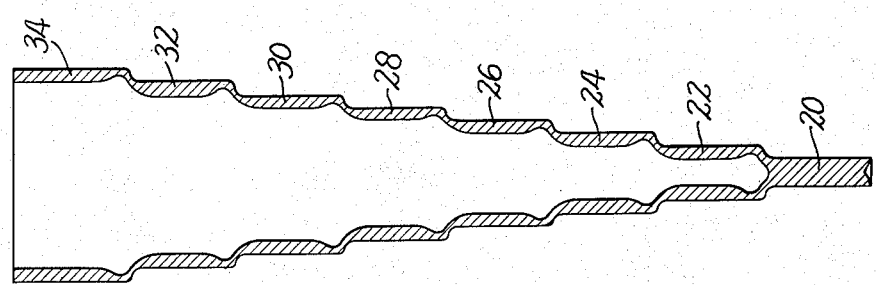
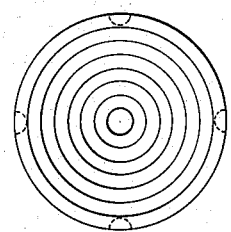
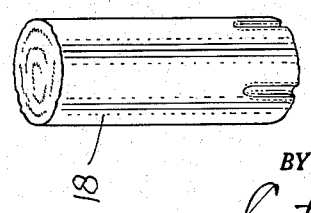
INVENTOR.
CROSBY FIELD
BY
Curtis, Morris & Safford
ATTORNEYS May 29, 1956  C. FIELD  2,747,379
LAMINAE FREEZER Filed April 9, 1952　　　　　　　　　　　　　　　　　　　10 Sheets-Sheet 8

INVENTOR.
CROSBY FIELD

BY
Curtis, Morris & Safford
ATTORNEYS

May 29, 1956 C. FIELD 2,747,379
LAMINAE FREEZER
Filed April 9, 1952 10 Sheets-Sheet 9

INVENTOR.
CROSBY FIELD
BY
Curtis, Morris & Safford
ATTORNEYS

May 29, 1956 — C. FIELD — 2,747,379
LAMINAE FREEZER
Filed April 9, 1952 — 10 Sheets-Sheet 10

INVENTOR.
CROSBY FIELD
BY
Curtis, Morris & Safford
ATTORNEYS

United States Patent Office 2,747,379
Patented May 29, 1956

2,747,379

LAMINAE FREEZER

Crosby Field, Brooklyn, N. Y., assignor to Flakice Corporation, Brooklyn, N. Y., a corporation of Delaware Application April 9, 1952, Serial No. 281,377

17 Claims. (Cl. 62—106)

This invention relates to the congealing of liquids, and more particularly to the making of ice by freezing laminae or thin shells into large cylindrical pieces of substantially regular configuration. The term "ice" is here used in its broadest sense as meaning not only the product obtained by freezing water, but also the products obtained by freezing other fluids where the frozen product has a specific gravity less than the liquid from which it has been frozen.

An object of this invention is to provide an improved and dependable method and apparatus for congealing liquids in a minimum of time. A further object is to provide for building up relatively large bodies of ice from smaller bodies in a manner which is thoroughly practical in every respect. A further object of this invention is to obtain a mass of ice which can be frozen in the same time as ordinarily would be required to produce ice having very much less wall thickness. Another object of this invention is to provide a means whereby the product may be obtained in the required shape by utilizing the force of gravity to float the finished product in the liquid from which it has been frozen. A further object is to provide for all of the above in a thoroughly practical construction which is adapted for readily economical manufacture and which is dependable and efficient in use and which will satisfy all of the requirements encountered with this type of apparatus. A still further object is to provide a method and apparatus for producing ice in large volume and in an efficient manner, bearing in mind all of the above.

With these and other objects in view, which will become obvious as the embodiments of the invention illustrated herein are described further, it will be understood that the invention consists of a new product, a method of obtaining that product, an apparatus illustrating an embodiment of that method, and certain essential features of construction, combinations of elements, arrangements of parts, and in the several steps and relation and order of each of the same to one or more of the others.

In the drawings:

Figure 7 is a schematic view of the electrical circuits for a single tube assembly;

Figure 8 is a perspective view of the refrigerant and water circuits of a single tube assembly;

Figure 13 is a top plan view of a body of ice such as is formed during each freezing cycle;

Figure 14 is a perspective view of the body of ice of Figure 13;

Figure 15 is a vertical section of a shell of ice representing the shape of the ice which is formed during a single freezing cycle;

Figure 16 is a side elevation of a similar shell of ice formed during two freezing cycles;

Figure 17 is similar to Figure 16 but shows the ice formed during three freezing cycles;

Figure 18 is a view similar to Figures 16 and 17 but showing the ice formed in eight freezing cycles;

Figure 25:
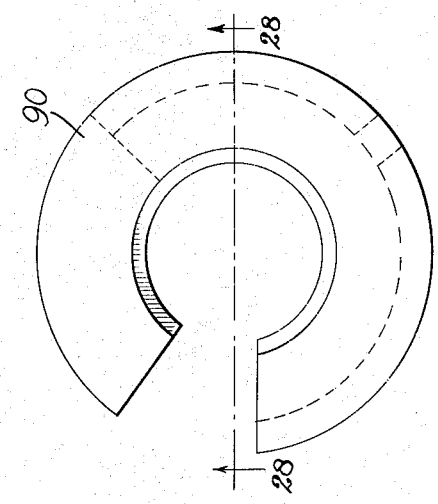
Figures 23, 24 and 25 are top elevations of elements of the heater or girdle coil units.
Figure 24:
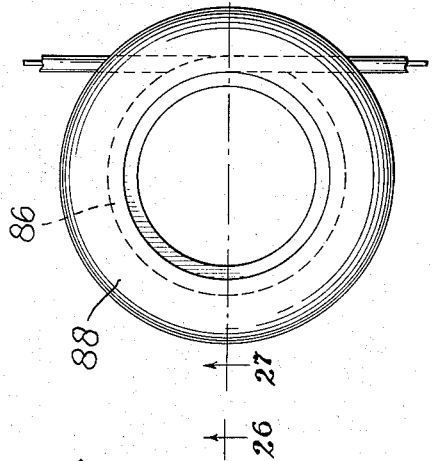
Figure 23:
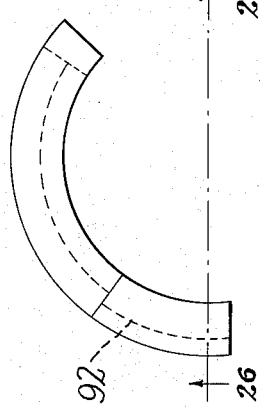
Figure 28:
Figure 27:
Figure 26:
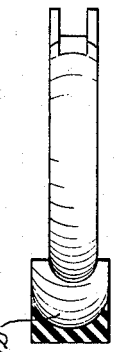

Figures 26, 27 and 28 are sectional views respectively on the line 26—26 of Figure 23, line 27—27 of Figure 24, and line 28—28 of Figure 25.

Figure 1:
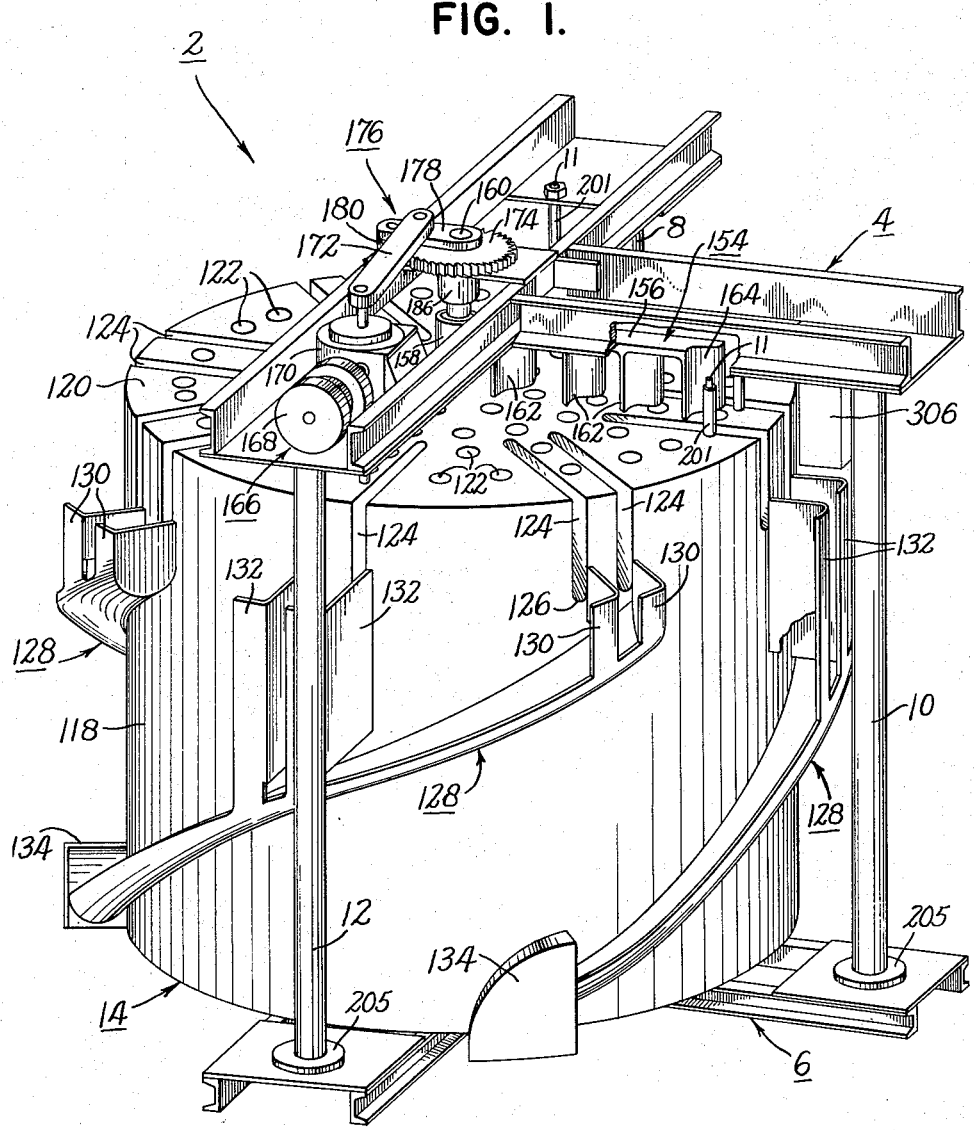
Figure 1 is an overall perspective view of a machine constituting one embodiment of the invention.

Referring to Figure 1 of the drawings, an ice making unit 2 is rigidly supported in a frame comprising a top frame 4, a similar bottom frame 6, and three upright pipes 8, 10 and 12 (see also Figure 3); and the frame is clamped together by a plurality of stay bolts 11 extending between the top and bottom frames. Rigidly clamped between the frames is a cylindrical shell or casing 14 which houses the mechanism for producing the ice. This mechanism is in the form of sixty-four individual ice making tube assemblies which will be described in detail below and one of which is shown in Figure 4 and is designated by the numeral 16.

Each of these tube assemblies 16 is adapted to be filled with water and the water is frozen in a step-by-step operation so as to build up laminae or layers of ice. Figures 15 to 18 are schematic representations showing how the ice is formed, although the dimensions are changed in these figures so that the thickness of the laminae and the length of the ice sections or bodies are not true representations. The final product is a cylindrical body of ice shown proper size in Figure 14 and designated at 18; and, Figure 13 is an end view of the ice body with the division lines between the laminae exaggerated.

As indicated above, the ice forming operation is carried on in cycles and during each cycle a layer of ice is formed of the configuration of Figure 15 which comprises a solid stick or rod of ice 20 at the bottom, and laminae or cylinders of the same length but of successively larger diameter and designated 22, 24, 26, 28, 30, 32 and 34. The ice forming operation involves first building up a body of ice, such as shown in Figure 18 and thereafter carrying on successive freezing and harvesting cycles during each of which the bar of ice is raised a distance equal to the common length or axial dimension. The cycle also includes the step of breaking off the top of the column or rod in the form of the cylindrical body of ice 18 of Figures 13 and 14.

In this embodiment of the invention the freezing tubes are refrigerated by direct expansion of refrigerant and the harvesting operation is carried on by cutting off the refrigerant flow and then freeing the ice rod by heating the tube surfaces upon which the ice has been formed. This heating is by induction heating, using high frequency electrical power. The freezing tubes are flooded with water from a constant level water source through the lower ends of the tubes so that the rods of ice rise due to the action of gravity which causes the water to flow into the bottoms of the tubes and float the ice upwardly. Prior to carrying out the above steps of each harvesting operation, the upper end of each rod of ice is broken off.

Figure 11:
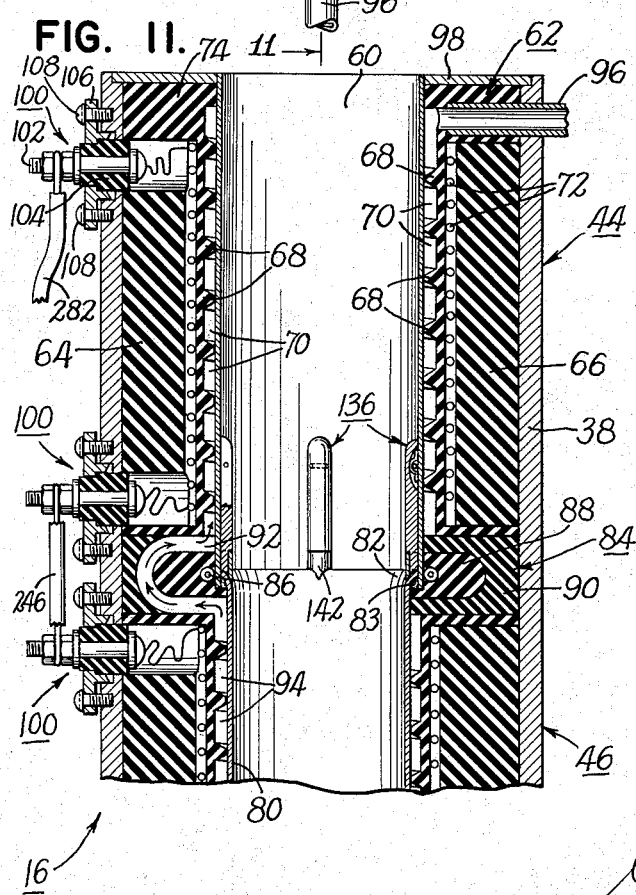
Figure 11 is a fragmentary sectional view on the line 11—11 of Figure 9.
Figure 21:
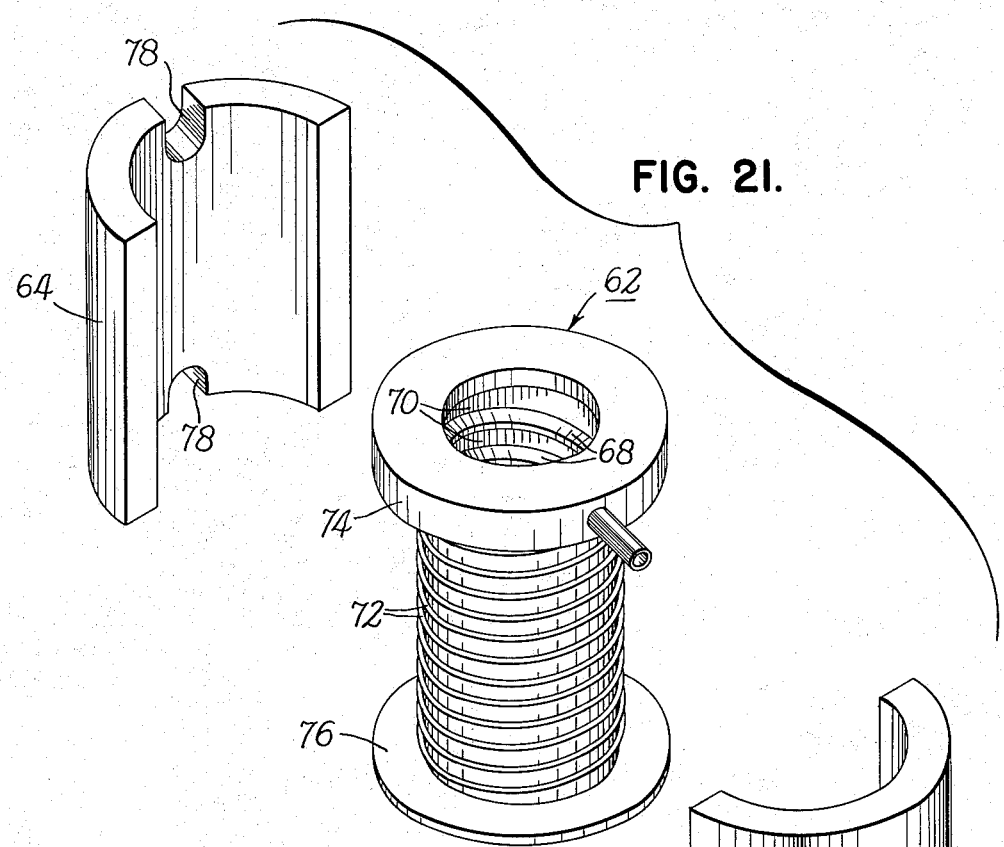
Figure 21 is an exploded view of one section of the refrigerant and electrical assembly which surrounds a freezing tube.
Figure 22:
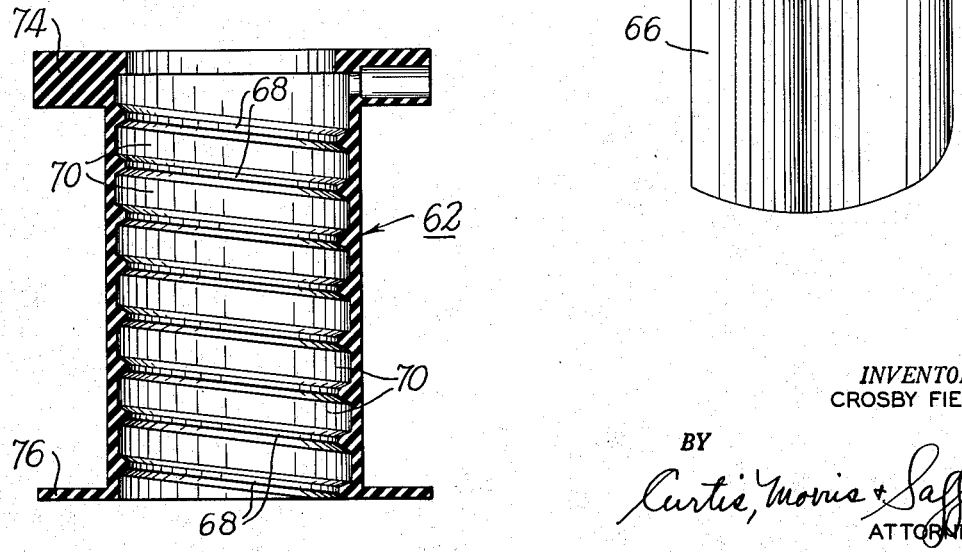
Figure 22 is a sectional view of the insulator spool of Figure 21.

Referring again to Figure 4, each freezing tube assembly comprises a bottom cylindrical outer shell 36 and an upper cylindrical outer shell 38 rigidly welded together at a ring 39 and supported by a pair of mounting plates 40 and 42. Shells 36 and 38 enclose eight freezing tube section assemblies 44, 46, 48, 50, 52, 54, 56, 58 of equal length. Each of these sections is of the character shown in Figures 11, 21 and 22 except that these figures show the top section 44 and the other tube sections are of lesser diameter to produce the ice laminae. Referring particularly to Figure 11, assembly 44 comprises a thin steel freezing tube section 60, a plastic refrigerant evaporator shell 62 (see also Figures 21 and 22) and a pair of semi-cylindrical plastic insulating shells 64 and 66. Shell 62 is snugly fitted onto the outer surface of tube section 60, and has a spiral rib or thread 68 of eight turns which contacts the tube surface and forms a spiral evaporator passageway 70 through which the refrigerant flows.

Surrounding shell 62 is an electrical coil 72 which carries a high frequency electric current during the harvesting operation so as to induce sufficient current in the wall of the freezing tube section to heat the tube section and melt the ice free. The semi-cylindrical shells 64 and 66 fit snugly onto coil 72 in between the end flanges 74 and 76 upon shell 62, and shell 64 has a pair of end notches 78 through which electrical connections are made to the ends of coil 72. The assembly 46 has a freezing tube section 80, the upper end 82 of which is flared outwardly and projects into the lower end of tube section 60 and at 83 is welded thereto.

Surrounding the overlapping ends of sections 60 and 80 is an insulating and heating assembly 84. This assembly is formed by a resistance heater or girdle coil 86 in contact with the lower end of tube section 60, a plastic insulating ring 88 which surrounds the coil, and a plastic heat insulating ring assembly 90. The construction of this insulating and heating assembly 84 is shown in Figures 23 to 28; the assembly 90 is formed by two elements shown in Figures 23 and 26 and Figures 25 and 28 respectively, and these two elements are fitted together around ring 88 to form a solid construction except for (see Figure 11) a somewhat C-shaped refrigerant passageway 92. Passageway 92 provides the refrigerant passageway between the refrigerant evaporator groove 94 of the freezing tube assembly 46 and the passageway 70 of assembly 44. Thus a refrigerant passageway is provided from one freezing tube section assembly to the next and the top of passageway 70 is connected to a refrigerant outlet 96 which extends through an opening in shell 38 and is welded thereto. The top of shell 38 is closed by a disc ring 98 which is welded to the shell and also to the top of tube section 60.

Figure 9:
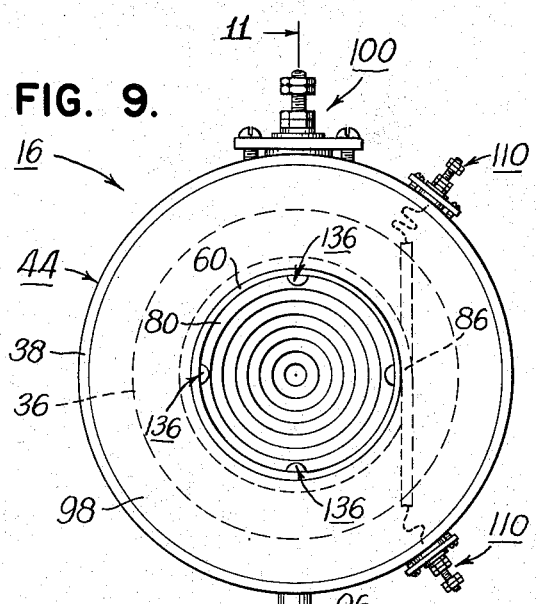
Figure 9 is a top plan view of a single freezing tube.

As shown at the left in Figure 11, each of the ends of each coil 72 is connected to an electrical terminal 100 which is formed by a terminal bolt 102 which extends through an insulating bushing 104 clamped in placed by a sealing ring 106 and four screws 108. A sealing gasket surrounds bushing 104 and provides a refrigerant tight seal around the terminal. The terminal bolt has its head connected to the coil and its projecting end provides a terminal to which an electric lead line or wire is removably connected. As shown best in Figure 9, each of the resistance heater or girdle coils 86 has its ends connected to a pair of terminals 110 which are identical with the terminals 100 except that they are of smaller size.

Referring again to Figure 4, each of the freezing tube section assemblies is constructed exactly in accordance with that of section 44 except that they have the smaller diameters as explained above. The bottom of shell 36 is closed by a disc 112 through which an extension of the lower freezing tube section 114 projects so as to provide the connection for the water to be frozen as is explained above. A refrigerant inlet tube 116 identical with tube 96 is also provided which provides for supplying refrigerant to the bottom of the refrigerant evaporator chamber in the lower-most assembly 58.

It has been indicated above that in this embodiment of the invention there are sixty-four freezing tube assemblies of the type shown in Figure 4 and they are mounted as a rigid unitary structure within the casing 14 (see Figure 1). Shell 14 is of sheet metal with a cylindrical vertical wall 118, and a disc-like top wall 120. The tube assemblies are positioned in four concentric rows 117, 119, 121 and 123, in accordance with the predetermined pattern shown in Figure 2, and at the open upper end of each of the tube assemblies the top wall 120 has an opening 122 of a diameter identical with that diameter of the top freezing tube section 60. Casing 14 is also provided with eight pairs of ice directing chutes 124 which are in pairs and extend somewhat radially outwardly to the outer wall of the casing from the second row 119 of freezing tube assemblies, and which extend downwardly at the angle of 30° to the horizontal (see Figure 3). These chutes have flat side walls and somewhat semi-cylindrical bottom walls 126 along which the ice bodies slide freely.

Mounted upon the outside of casing 14 are four spiral ice chutes 128 each of which terminates at its upper end in a pair of ice deflectors 130 at the outlets of a pair of the ice chutes 124. Each chute 128 also is provided with a second pair of deflectors 132 at the outlets of another pair of the chutes 124. Each of these spiral chutes 128 terminates at an ice receiving hood 134 which is in the top of an ice storage compartment positioned directly beneath the ice making unit.

It has been indicated above that the harvesting operation comprises breaking an ice body from the top of each rod and then melting the bond between that rod and its freezing tube assembly so as to permit the rod to float upwardly. Thus at the end of the harvesting operation for one particular freezing tube assembly, the ice body projects from the top of the tube assembly above the top wall of casing 118. The freezing operation is restarted immediately so that the water within which the ice body is floating is frozen into ice and the cycle is therefore completed with the ice rod again frozen tightly in its freezing tube assembly.

Figure 12:
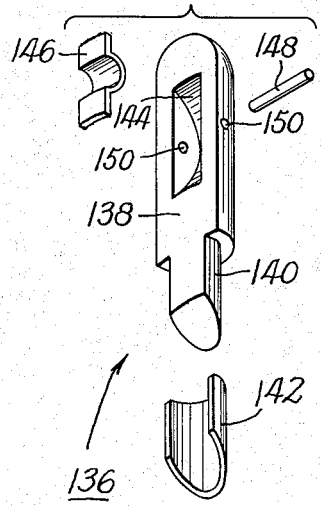
Figure 12 is an exploded view of one of the ice guiding assemblies of Figure 11.

During the time that the ice is floating freely in the layer of water surrounding it, it is important that the ice rod be held properly centered within the tube so that it is surrounded by an even layer of water. Therefore, ice will be formed rapidly and efficiently as illustrated in Figure 15. The proper centering of the ice is accomplished by providing four guide or centering strips 136 (see Figure 11) at the bottom of the top freezing tube section 60. These guide strips are constructed as shown in Figure 12 and are of heat insulating plastic. Each of these strips is generally semi-cylindrical with a slightly arched face 138 which mates with the adjacent surface of tube section 60 and with a reduced lower portion 140 which projects into a pocket formed by a metal bracket 142 welded to the top of tube section 80 and the adjacent surface of tube section 60. Guide strip 136 is recessed at 144 to receive a bracket 146 which is welded to the inner surface of tube section 60. The top of the guide strip is then held by a pin 148 which is received with a friction fit in openings 150 in the guide strip and projects through the loop formed by bracket 146. Thus the guide strips are held snugly in place and as the ice rod rises, it is held properly centered, and the ice does not tend to adhere to the plastic guide strips.

Figure 10:
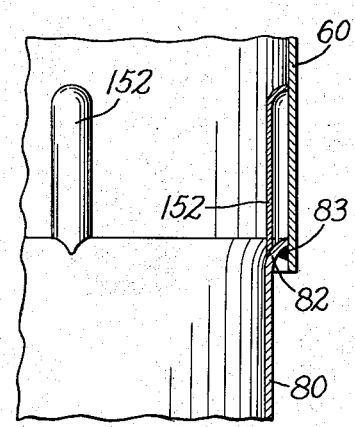
Figure 10 is a fragmentary view showing a modified form for the ice guiding structure in the tube assembly.

Under some circumstances metal guide strips are preferable in which case the guide strips 152 of Figure 10 may be used. These strips have the same general configuration as guide strips 136 but are of sheet metal and are welded in place throughout their edges. These strips are heated during the harvesting operation simultaneously with the heating of the tube sections.

It has been pointed out above that the initial step in the ice harvesting operation for each freezing tube assembly is to break off the projecting upper end of the ice rod. In this embodiment this breaking operation is performed by a rotating cam assembly shown in Figures 1, 2 and 3 and indicated at 154. This cam assembly comprises a top cam plate or arm 156 which is mounted by a central hub 158 upon a rotatable vertical stub shaft 160. Arm 156 carries four downwardly extending cam paddles or plates 162 which (see Figure 2) are positioned respectively at the radii of the four rows of freezing tube assemblies. Each of these cam plates is therefore moved along the top of an annular row of the freezing tubes so that during one complete revolution of the arm 156 each of the freezing tube assemblies has a cam plate pass over it.

Figure 2:
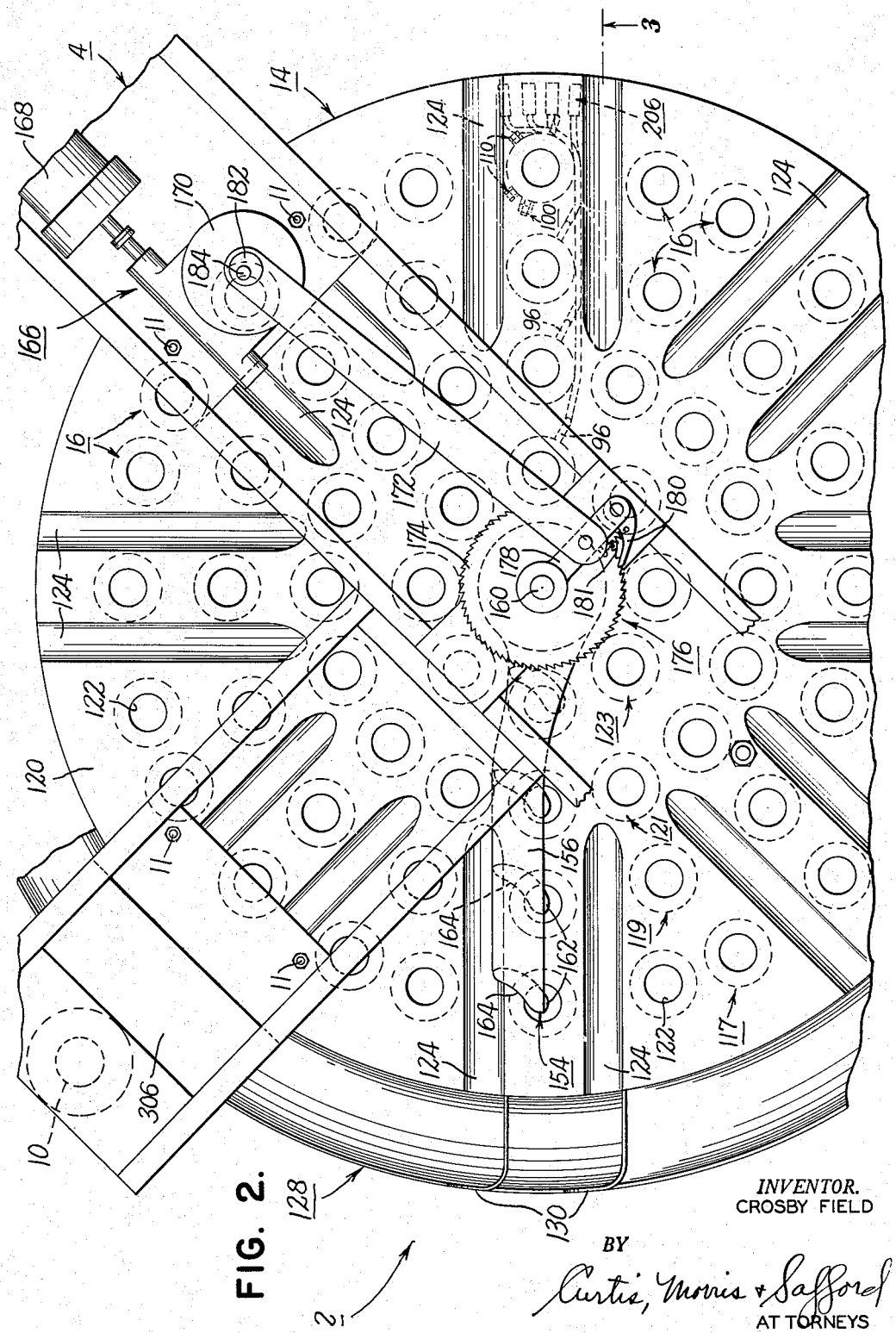
Figure 2 is a top elevation of the machine with the right-hand portion cut away.
Figure 3:
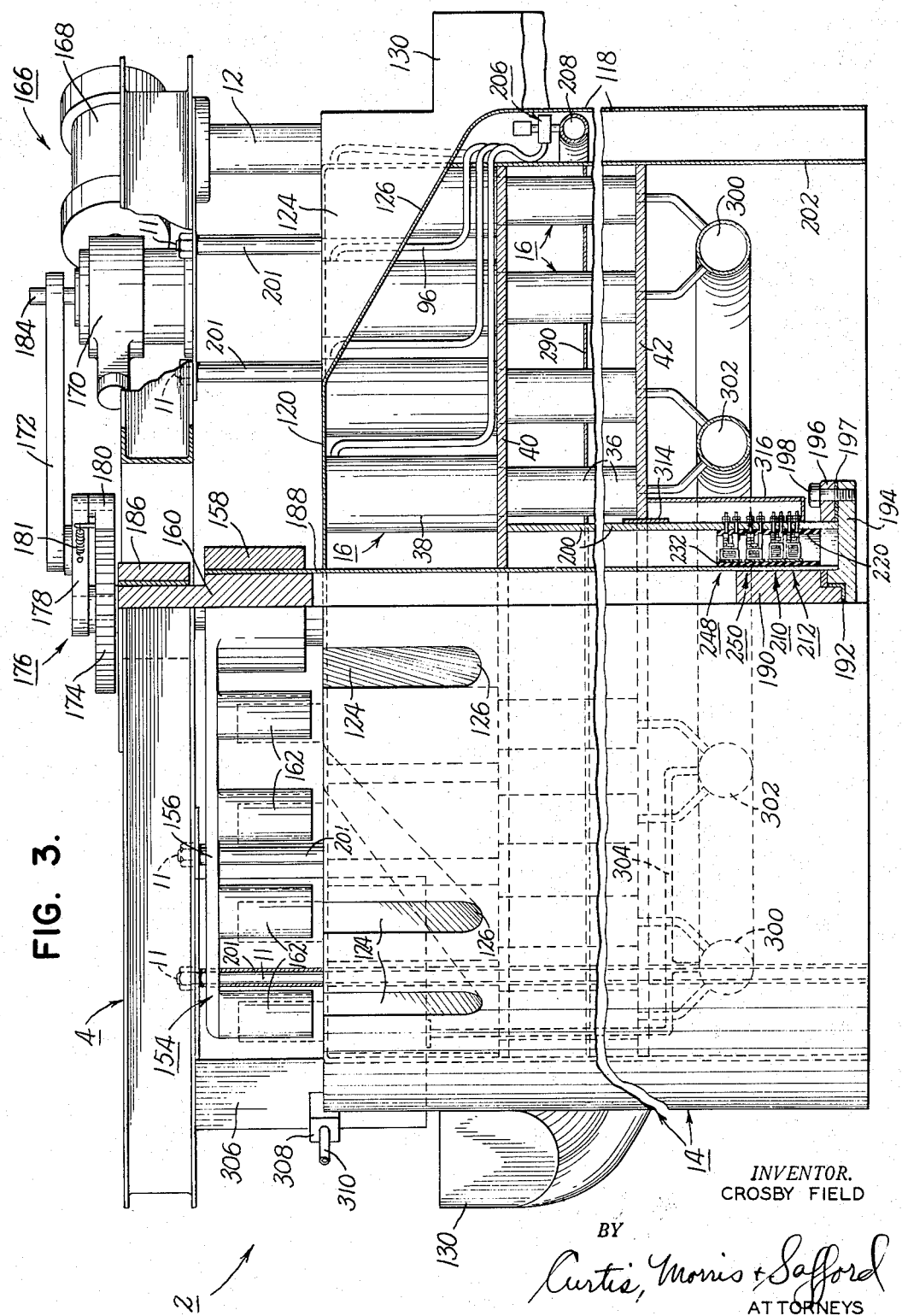
Figure 3 is an enlarged side elevation of the machine with the right-hand portion in section and with the central portion of the freezing assembly cut away on the line 3 of Figure 2.
Figure 4:
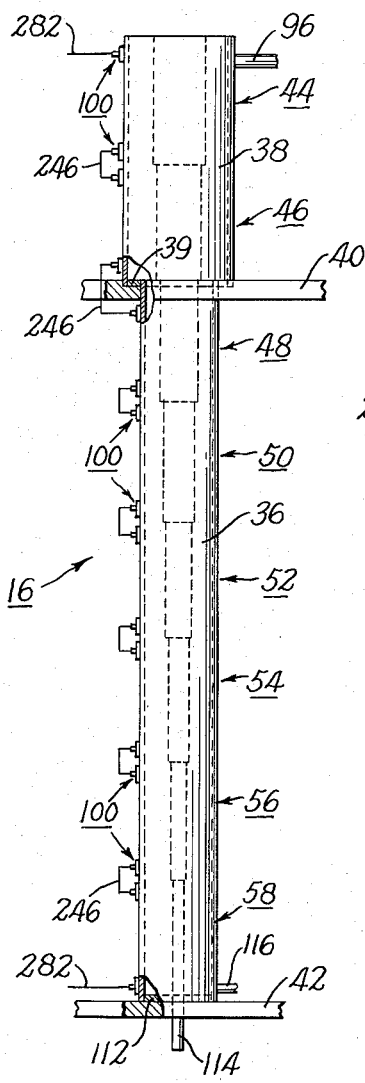
Figure 4 is a fragmentary view of one freezing tube assembly.

These cam plates are shaped as shown in Figure 2 with a leading cam face 164 which is adapted to engage and exert a force upon a body of ice projecting from one of its freezing tube assemblies, as shown in broken lines in Figure 3. This engagement tends to push the ice body radially outwardly and in a clockwise direction in Figure 2, and the force is sufficient to break the projecting ice body free from the ice rod which is at that time frozen tightly to its freezing tube assembly.

The turning movement is imparted to the cam assembly by a ratchet drive 166 (see Figure 3) which includes an electric motor 168, a gear reduction assembly 170, an arm 172, a ratchet wheel 174 mounted upon and keyed to shaft 160, and a swinging ratchet drive unit 176. This drive unit is formed by a swinging arm 178 freely pivoted upon shaft 160, and a ratchet dog or pawl 180 which is held in contact with the ratchet wheel by a spring 181. The opposite end of arm 172 is pivoted upon a crank disc eccentric 182 (see Figure 2) which is mounted upon and keyed to a crank pin 184. When the motor 168 is operated, crank pin 184 is turned so that crank disc 182 is rotated and arm 172 is oscillated, and this oscillatory movement is transmitted through arm 178 to dog 180. When the arm 178 swings clockwise the dog acts through the teeth on the cam wheel to impart the movement to the wheel, and this movement is transmitted to the cam arm through shaft 160. When arm 178 swings counterclockwise, the dog slides over the teeth on the cam wheel and is held by the spring 181. Thus with the constant operation of motor 168, the cam arm is moved with a step-by-step movement in a clockwise direction.

Referring again to Figure 3 the stub shaft 160 is mounted in a sleeve bearing 186 which is rigidly mounted upon the frame 4 and the lower end of the shaft is enlarged and is snugly received in and welded to the top of a rotatable cylindrical shaft 188. The hub 158 of the cam arm 156 is fixed to the upper end of this hollow shaft and at the zone where shaft 188 is connected to shaft 160. The lower end of the hollow shaft carries a reinforcing bearing plug 190 which rests upon a bearing 192 supported by a disc plate 194. Plate 194 is in turn supported from a flange or ring 196 which has a gasket 197 and is clamped to the periphery of the disc plate by a plurality of stud bolts 198 and is welded to a rigid cylindrical shell 200. Shell 200 is part of the supporting frame for the machine and extends upwardly through plate 42 and terminates at plate 40. As indicated above, the freezing tube assemblies are rigidly mounted on plates 40 and 42 which are welded to shell 200; and the entire assembly is supported from the frames 4 and 6 through a set of spacer sleeves 201 on each of the stay bolts 11 by which the plates 40 and 42 are clamped. A crown sheet 203 rests upon the top of the tubes and a cylindrical shell 201 and the casing 14 surround the tubes and rest upon frame 6. The ends of the pipes 8, 10 and 12 rest in pipe flanges 205 which are welded to the frames 4 and 6 so that the pipes hold the frames in rigid relationship.

It has been pointed out above that the harvesting operation for each tube assembly includes the step of discontinuing the refrigeration operation and heating the freezing tube walls to free the ice. The refrigeration operation is discontinued by shutting off the flow of refrigerant gas from the freezing tube assembly in a manner now to be described. The refrigerant flow to each of the freezing tube assemblies is as represented in Figure 8 with there being a liquid refrigerant header 204 at the bottom connected to the bottom of freezing tube section assembly 58 of each of the freezing tube assemblies through an expansion orifice 205 and the refrigerant supply tube 116 for that assembly. The top of the assembly is connected through its tube 96 and a solenoid valve 206 to a refrigerant gas header 208. Thus, during the harvesting operation of the assembly of Figure 8, its valve 206 is closed and the refrigerant pressure builds up very rapidly in the evaporator passageways so that there is no further cooling effect and freezing ceases.

Figure 20:
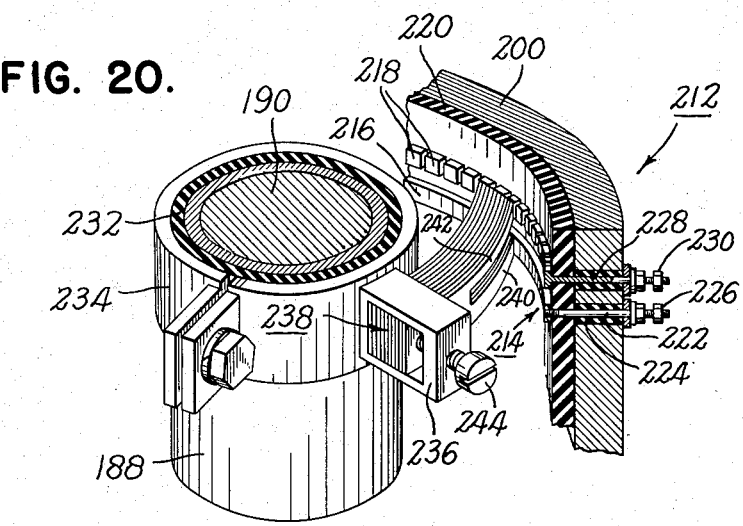

In practice it is desirable to discontinue the refrigerant operation for a period of time prior to the heating of the tube walls to free the ice. Accordingly the arrangement herein disclosed provides for the closing of solenoid valves 206 for three of the tube assemblies at all times and the heat is applied to only the one tube from which the refrigerant has been turned off the longest. Solenoid valves 206 are of the normally open type which are closed when their solenoids are energized. This sequential valve closing operation is carried on by a pair of identical commutator assemblies 210 and 212 which are shown at the lower central portion of Figure 3 and the latter of which is shown in detail in Figure 20.

This assembly comprises a commutator bar assembly 214 formed by a conductor ring or strip 216 and a parallel row of commutator segments 218 mounted upon a cylindrical shell 220 of insulating material which is carried by the inner surface of shell 200 and is filled with arc-quenching oil. Conductor strip 216 has connected to it a terminal rod 222 which extends through an insulating sleeve 224 in an opening through shell 200 and terminates in a terminal 226. Each of the commutator segments 218 is similarly connected to a terminal rod 228 also extending through an insulating sleeve through the shell and terminating in a terminal 230. Mounted upon the hollow shaft 188 and electrically insulated therefrom by an insulating sleeve 232 is a clamping sleeve 234 which carries a bracket 236. Bracket 236 carries a brush assembly 248 which is formed by a stack of copper strip brushes clamped in bracket 236 by a set screw 244. Each of the brush strips has two legs, one leg 240 of which wipes along the conductor strip 216 and the other leg 242 of which wipes along the row of commutator segments 218.

Referring again to Figure 3, the commutator assembly 210 is identical with assembly 212 and is mounted directly thereabove so that the two brush assemblies 238 (Figure 20) move together step-by-step around the commutator segments. The two terminals 226 are connected respectively to the two sides of a 110 volt, 60 cycle source of current, and each of the solenoids for valves 208 is connected at one side to a terminal 230 of the commutator assembly 212 and a vertically (i. e., axially) aligned terminal 230 of the commutator assembly 210.

Thus, when the hollow shaft 188 is rotated as discussed above, the brush assembly is moved step-by-step around the commutator assembly so that at least three of the freezing tube assemblies have their solenoid valves closed at all times, and during each revolution of the hollow shaft each of the valves is closed for the period of harvesting for its freezing tube assembly.

It has been pointed out above that the ice is melted free in each freezing tube assembly by inductive heating, which is produced by supplying high frequency current to the coils 72 (Figure 11). These coils in each freezing tube assembly are connected in series through their terminals 100 and jumper leads 246, and current is supplied to the freezing tube assemblies individually by a pair of two identical commutator assemblies (see Figure 3) 248 and 250 which are positioned directly above assembly 210 and which are similar thereto.

Figure 19:
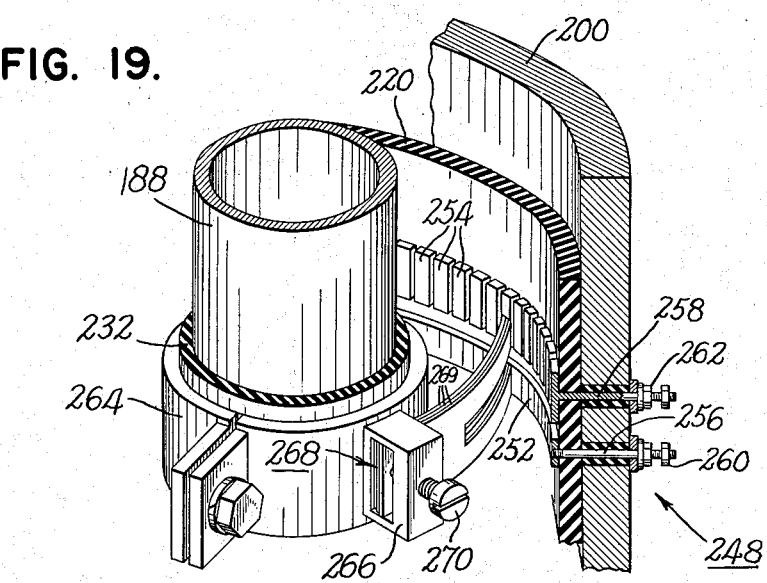
Figures 19 and 20 are fragmentary perspective views showing commutator assemblies.

Assembly 248 is shown in Figure 19 and comprises the following elements which are identical with the correspondingly named elements of assembly 212 except as is specified below: conductor strip 252, a row of commutator segments 254, terminal rods 256 and 258, terminals 260 and 262, clamping sleeve 264, bracket 266, brush assembly 268 formed of strips 269, and set screw 270. The terminals 260 of assemblies 248 and 250 are connected to a source of high frequency current, illustratively of a frequency of 600 to 2,600 cycles. The electrical circuits of the coils 72 of the various tube assemblies are connected across aligned pairs of the terminals 262 of the two assemblies 248 and 250. The brush assembly 268 is of such thickness that it contacts only one commutator segment at a time and its two legs rest respectively upon a conductor strip 252 and one of the commutator segments.

The inductive heating for each tube assembly is carried on only during the final period of the harvesting operation. Therefore brush assemblies 248 and 250 are so related to assemblies 210 and 212 that each step movement of the hollow shaft 188 moves the brush assemblies 268 onto the segments 254 for the freezing tube assembly which has its pair of solenoid valve control segments 218 so positioned that the trailing portion of the brush assemblies 238 simultaneously move thereon. In other words, for each freezing tube assembly the tube heating operation is carried on at the end of the period of time that the refrigerant solenoid valve is closed.

The electrical circuit for an illustrative freezing tube assembly is illustrated schematically in Figure 7 where the relationship between the parts is demonstrated. The heater or girdle coils 86 are connected in series by jumper leads 272, and they are supplied with 60 cycle, 110 volt power through a pair of leads 274. This same power source is connected through a pair of leads 276 to the respective terminals 226 of the commutator assemblies 210 and 212, thus to supply power to the solenoid valve control circuit. A pair of leads 278 extends from a pair of illustrative terminals 230 to the corresponding solenoid valve 206 (see also Figure 8). The high frequency power is connected through a pair of leads 280 to the terminals 260 of the commutator assemblies 248 and 250, and a pair of leads 282 extends from an illustrative pair of terminals 262 to the circuit of the high frequency coils 72 of the corresponding freezing tube assembly, and these high frequency coils are connected in series as indicated above by jumped leads 246.

Energization of the high frequency coil 72 causes a relatively dense flux in the thin freezing tube walls, and a correspondingly rapid heating of the freezing tube sections. The efficiency of this heating effect is improved by providing the relatively thick walls of the cylindrical shells 36 and 38 for the corresponding flux paths on the outside of the coil. These thick walls permit a sufficiently sparse flux density to make the heating effect relatively small. However, the heating effect may be sufficient to give objectionable results if the heat is not removed. Accordingly, an air circulation system is provided for flowing air through the interior of the shell or casing at such a rate as to effectively remove this heat.

Figure 5:
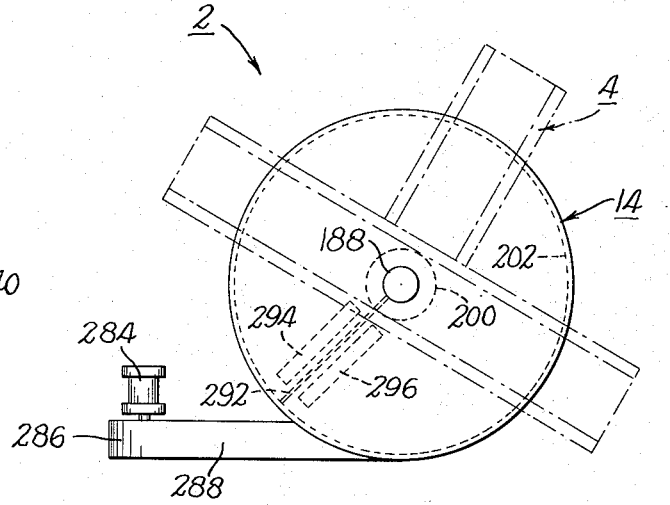
Figure 5 is a schematic view of the air circulating system.
Figure 6:
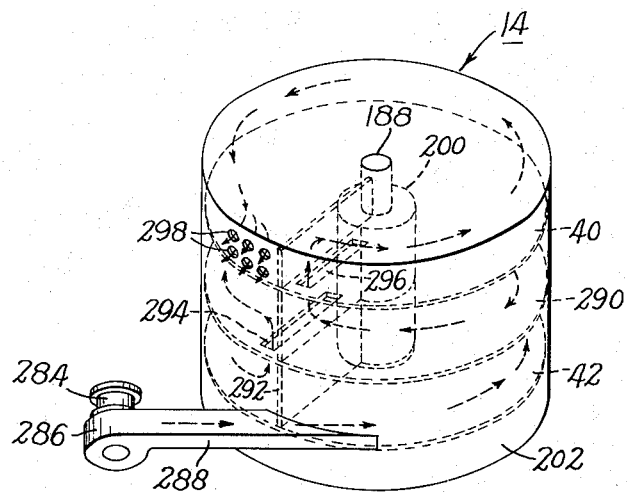
Figure 6 is a schematic perspective view of the unit of Figure 5.

This air circulating system is shown somewhat schematically in Figures 5 and 6 and will now be described. An electric motor 284 drives a fan 286, and directs air through a conduit 288 tangentially into the bottom of shell 202 directly above wall 42. A disc baffle 290 is positioned above wall 42 and is of the same diameter, and it is welded at its inner peripheries to shell 200. A radial and vertical baffle assembly 292 extends upwardly from wall 42 to the top of the casing and extends between shells 200 and 202. Baffle 290 has a rectangular opening 294 at the left of baffle assembly 292, and wall 40 has a similar opening 296 at the right of the baffle assembly. Shell 202 has a plurality of openings 298 in it at the left of this baffle assembly and above wall 40. Thus, the air which enters the bottom of the casing flows, as shown by the arrows in Figure 6, counterclockwise above wall 42 and thence through opening 292 and clockwise above baffle 290. It then flows through opening 296 and flows counterclockwise again above wall 40 and is discharged through openings 298. In this way, each of the freezing tube assemblies is continuously cooled throughout by the stream of air, and the waste heat produced during the harvesting operation is effectively dissipated.

It has been pointed out above that water is supplied to the bottom of each of the freezing tube assemblies through a tube extension 114. Referring now again to Figure 3, the tubes extending from the outer two rows of the tube assemblies are connected to a water header 300 and the tube assemblies in the inner two rows are connected to a similar header 302. These headers are cylindrical in cross-section and are ring-shaped and they receive water through a tube 304 from a tank 306 supported near the top of casing 14. The level of water in tank 306 is maintained level with the exact top of the tube assemblies by a level control valve 308 through which water flows into the tank from a water supply pipe 310.

It should be noted that the water level is maintained accurately so that all of the freezing tubes are flooded at all times. The harvesting operation is carried on for the freezing tubes singularly so that only one ice body is floating upwardly at any one time. Thus the tank 306 and the tubes through which the water flows may be relatively small in comparison with the size of the entire apparatus because water is flowing to only one tube at a time. The floating of each of the ice rods or bodies upwardly may take place relatively slowly but the difference in specific gravity between the ice and the water is sufficient to insure that the ice will rise. The axial length of the tube sections with respect to the diameter of the largest tube section 60 is such that an equilibrium condition is reached when the entire ice section 18 (Figure 14) emerges from the top of the freezing tube section 60. In other words, the dimensions of the tube sections shown in Figures 4 and 11 are such that when the ice rod or body is released and water is flowed in at the bottom, the ice rod floats upwardly an amount exactly equal to the axial length of the freezing tube sections.

It has been pointed out above that the junctures of the freezing tube sections are heated continuously by heater or girdle coils 86 and this heating effect is sufficient to cause an ice layer of reduced thickness to be formed at these juncture zones. This effect is shown in somewhat exaggerated condition in Figure 15 where the sections of the ice shell numbered 20 to 34 are interconnected by rings of ice of reduced thickness. Referring then to Figure 18, the entire body of ice has in it a number of annular pockets 312 of water of slowly formed ice. Thus when the top of the ice rod projects from the freezing tube assembly, the ice body 18 is connected to the remainder of the ice rod by this zone which contains these water pockets. This makes it possible to break off the ice body 18 without excessive force and also without damaging the ice body. It should be noted that the ice rod is at that time frozen solidly within the freezing tube assembly and the breaking operation is performed by a slow cam action.

The size of the water pockets 312 may be varied and in fact under some circumstances the trapped water may be frozen, but this freezing tends to crack and rupture the web of ice surrounding each pocket so that even if no free water remains, the ice rod is weakened at this zone. It has been pointed out above that the ice rods tend to rise by the action of gravity when they are freed. However, this rising movement may be augmented by mechanical means striking a blow upon the bottom of each ice rod immediately after it is released.

In the above discussion it has been indicated that refrigerant is supplied at the bottom of the freezing tube assemblies and is withdrawn at the top. Under some circumstances the refrigerant is supplied to the top of the freezing tube assemblies and is withdrawn at the bottom. Hence, the refrigerant tubes 116 and 96 may be considered as either inlet or outlet tubes depending upon the particular arrangement which is used. Although it has been stated that the bond between the ice and the freezing tube sections is broken by melting of the ice, it should be pointed out that other phenomena are involved, possibly a mechanical breaking of the bond by the sudden local expansion of the metal tube due to the heating caused by the induced electric currents.

It has been pointed out above that the entire assembly is held together by the stay bolts 11 (see Figure 2) which carry spacer sleeves 201 and clamp the frames together with the ice making unit supported thereby. The electrical circuits extend from the bottom of the unit at the base of shell 200 (Figure 3) and wires extend upwardly through insulator sleeves 314 in plate 42 and through similar sleeves not shown in plate 40. The electrical terminals and wires beneath plate 42 are protected by a cylindrical metal box 316 which is in sections and may be removed when desirable. It has been indicated above that shell 200 is filled with oil to the top of shell 220 so that commutator arcing is reduced to a minimum. The additional electrical and refrigerant control facilities of standard types are housed in the casing 14 and do not appear in the drawings. The top and bottom frames 4 and 6 are substantially identical and each is formed by a main portion extending the entire diameter of the unit and a right angle portion extending radially therefrom. Each of these portions is formed by a pair of channel members connected adjacent the periphery of the unit by plates welded thereto.

It has been pointed out above that there is a relationship between the axial length and the diameter of the ice bodies which are formed and the dimensions of the freezing tube sections. This relationship may well be expressed in the following terms: the ice body which projects from the freezing tube assembly has a volume equal to the increase in volume when ice is formed of the quantity of water which the entire assembly will contain. In other words, the body of ice floating in water projects from the surface of the water by an amount equal to the increase in volume at the time of freezing, and it is this amount which is harvested during each cycle of operation for each freezing tube assembly.

As many possible embodiments may be made of the mechanical features of the above invention and as the art therein described might be varied in various parts, all without departing from the scope of the invention, it is to be understood that all matter hereinabove set forth, or shown in the accompanying drawings, is to be interpreted as illustrative and not in a limiting sense.

What is claimed is:

1. In congealing apparatus of the character described, the combination of, a freezing tube assembly comprising a plurality of axially aligned freezing tube sections of different and successively greater diameters along the axis and presenting metal surfaces upon which laminae of ice are formed and so arranged that the smaller diameter laminae are moved axially during successive cycles whereby larger laminae are formed around smaller laminae to build up a body of ice which has its end projected from the end of the largest freezing tube section, ice breaking means which is moved along a path into contact with the body of ice projecting from said freezing tube assembly, and cycle means to freeze the laminae of ice and thereafter break the projecting body of ice free and to subsequently cause the laminae to move axially whereby another body of ice projects from the freezing tube assembly.

2. Apparatus as described in claim 1 wherein said freezing tube sections are formed by thin cylindrical metal sections, and wherein the apparatus includes, refrigerant evaporator means formed by non-metallic shells, high frequency coils surrounding said shells and adapted to heat said freezing tube sections by induction heating, and resistance heating means to reduce the rate of ice formation at the junctures between the laminae.

3. Apparatus as described in claim 2 wherein said tube sections are positioned with the larger diameter section at the top and the sections are flooded with water at the beginning of each freezing cycle, and wherein the axial length of each tube section is equal to the length of a body of ice of the diameter of the largest section and which projects above the water level when a substantially solid body of ice formed in the tube assembly is floated in water with its largest end projecting from the water.

4. Apparatus as described in claim 3 which includes, a mounting frame and shell construction for said tube assembly, and water supply means to maintain the level of the water at the top of the tube assembly.

5. In congealing apparatus of the character described, the combination of, a substantially cylindrical shell and mounting frame construction positioned with a vertical axis, a plurality of freezing tube assemblies each comprising a plurality of axially aligned freezing tube sections of different and successively greater diameters along the axis and presenting metal surfaces upon which laminae of ice are formed and so arranged that each smaller diameter laminae is formed at the bottom and is floated upwardly during the harvesting operation into a position in alignment with the next larger diameter surface whereby a lamina is formed therearound to build up an ice body at the top of the assembly, said assemblies being rigidly mounted within said construction in arcuately aligned rows with their tube sections of largest diameter open at the top of the construction, an ice breaker construction comprising cam means and mounting means therefor to move said cam means along the arcuate rows to engage and break the bodies of ice projecting from said tube assemblies, and control means to release the ice from the freezing surfaces and to float the ice bodies upwardly and thereafter freeze the ice bodies solidly into the assemblies whereby they are rigidly held during the breaking operation.

6. Ice making apparatus as described in claim 5 which includes, water supply means in the form of a tank having a liquid level control device to maintain the level of the liquid at the top of the tube assemblies and including water distributor means beneath the tubes through which water is supplied to each of the assemblies, refrigeration means to supply liquid refrigerant individually to said assembly and to withdraw gaseous refrigerant therefrom, and ice receiving means to which the ice is delivered after it is broken free.

7. Apparatus as described in claim 6 wherein said ice receiving means comprises, chute means extending radially outwardly and downwardly in the top wall of said construction, and a helical chute means on the exterior of said construction and adapted to receive ice from the first named chute means.

8. Apparatus as described in claim 7 wherein said construction includes, substantially identical top and bottom frames each of which includes a diametrically extending frame element, vertical post means extending between said frames, and a plurality of stay bolt assemblies extending between said top and bottom frames and clamping the entire construction together.

9. Apparatus as described in claim 8 wherein said ice breaker construction includes, a vertical mounting shaft upon which said cam mounting means is mounted, and ratchet means to turn said shaft with step-by-step movement.

10. Apparatus as described in claim 9 wherein said control means includes, a first pair of commutator assemblies controlling the electrical circuits to individual refrigerant controllers for the various tube assemblies, electrical harvesting means to free the ice from the freezing surfaces, and a second pair of commutator assemblies individually controlling the circuits to said electrical harvesting means for the various assemblies.

11. Apparatus as described in claim 10 wherein each of said commutator assemblies includes, a brush assembly mounted upon said shaft, and contactor means mounted upon a stationary shell construction which surrounds said shaft and which is adapted to receive a body of arc-quenching oil.

12. Apparatus as described in claim 11 wherein liquid refrigerant is supplied to each assembly through restricting means, and gaseous refrigerant is withdrawn through a normally open valve which is closed to stop the freezing operation for that tube assembly.

13. Apparatus as described in claim 12 wherein each of said tube assemblies includes, freezing tube means presenting the freezing surfaces and non-magnetic means cooperating therewith to form refrigerant circuits, metallic means extending parallel to said freezing surfaces, and wherein said electrical harvesting means comprises high frequency coils surrounding said freezing surfaces, and air circulating means to circulate air to carry away the heat produced in said metallic means which extends parallel to said freezing surfaces.

14. Apparatus as described in claim 13 which includes, electric heating means which is operated substantially continuously to reduce the rate of ice formation at the junctures of the freezing tube sections.

15. Apparatus as described in claim 14 wherein each tube assembly includes in the order of eight freezing tube sections the smallest of which has a solid rod of ice formed therein during each freezing cycle and each larger section is of a radius greater than the one beneath it by a constant amount which is related to the common axial length of the tube sections in such a way that the volume of ice formed during each freezing cycle is substantially equal to the increase in the volume when the amount of water which the entire tube assembly holds is frozen into ice.

16. In congealing apparatus of the character described, the combination of, a freezing tube assembly which includes in the order of eight freezing tube sections the smallest of which has a solid rod of ice formed therein during each freezing cycle and each larger section is of a radius greater than the one beneath it by a constant amount which is related to the common axial length of the tube sections in such a way that the volume of ice formed during each freezing cycle is substantially equal to the increase in the volume when the amount of water which the entire tube assembly holds is frozen into ice, water supply means to maintain the freezing tube assembly filled with water during the freezing operation, and means to sever the projecting ice from the body of ice formed within the assembly.

17. In the art of forming ice, the steps of, carrying on a cyclic ice forming operation each cycle of which includes the freezing of a layer of ice around an ice core to attach the ice to the freezing surfaces, each of said layers of ice being formed in distinct freezing zones of different diameters with each zone being positioned above the zones of smaller diameter, reducing the rate of ice formation at the junctures of the laminae between said zones, freeing the ice from the freezing surfaces, floating the body of ice in water whereby a portion of the ice projects above the top of the upper freezing zone and is connected to the remainder of the ice by a zone of reduced ice strength because of said reduced rate of ice formation, severing said projecting portion of ice, and starting a new cycle of operation.

References Cited in the file of this patent
UNITED STATES PATENTS

| Number | Name | Date |
|---|---|---|
| 1,923,522 | Whitehouse | Aug. 22, 1933 |
| 2,071,465 | Huber | Feb. 23, 1937 |
| 2,334,941 | Linden | Nov. 23, 1943 |
| 2,405,272 | Smith | Aug. 6, 1946 |
| 2,405,273 | Smith | Aug. 6, 1946 |
| 2,471,655 | Rundell | May 31, 1949 |
| 2,488,529 | Field | Nov. 22, 1949 |
| 2,522,507 | Field | Sept. 19, 1950 |
| 2,542,891 | Bayston | Feb. 20, 1951 |
| 2,546,092 | Field | Mar. 20, 1951 |
| 2,571,506 | Watt | Oct. 16, 1951 |
| 2,598,429 | Pownall | May 27, 1952 |
| 2,598,430 | Pownall | May 27, 1952 |
| 2,639,594 | Watt | May 26, 1953 |